United States Patent [19]
Miyake et al.

[11] Patent Number: 5,513,180
[45] Date of Patent: Apr. 30, 1996

[54] TELEVISION SIGNAL AND ATM CELL SWITCHING SYSTEM

[75] Inventors: Hiroshi Miyake; Yasuhiro Aso, both of Kawasaki, Japan

[73] Assignee: Fujitsu Limited, Kawasaki, Japan

[21] Appl. No.: 213,997

[22] Filed: Mar. 15, 1994

Related U.S. Application Data

[63] Continuation of Ser. No. 882,955, May 14, 1992, abandoned.

[30] Foreign Application Priority Data

May 14, 1991 [JP] Japan ................................. 3-108059

[51] Int. Cl.$^6$ ............................... H04L 12/56; H04J 3/24
[52] U.S. Cl. ............................ 370/60.1; 370/112; 348/7; 348/423; 348/461
[58] Field of Search ......................... 370/60, 60.1, 94.1, 370/94.2, 112; 358/142, 187, 86; 455/4.2, 5.1; 348/7, 423, 461, 465, 552

[56] References Cited

U.S. PATENT DOCUMENTS

| | | | |
|---|---|---|---|
| 4,302,771 | 11/1981 | Gargini | 455/42 |
| 4,831,616 | 5/1989 | Huber | 370/60 |
| 4,901,367 | 2/1990 | Nicholson | 455/5 |
| 4,947,244 | 8/1990 | Fenwick | 455/51 |
| 5,115,426 | 5/1992 | Spanke | 370/60 |

FOREIGN PATENT DOCUMENTS 0183871  6/1986  European Pat. Off. .

OTHER PUBLICATIONS

IEEE Global Telecommunications Conference & Exhibition, vol. 2, Nov. 28, 1989, Dallas, Texas, "Modeling and Analysis for Packet Video", Shan-shan Huang, pp. 0881–0885.

CATV Sessions Symposium Record, Jun. 10, 1985, Montreux, (CH), "Multichannel Broadband–ISND", Bottle et al., pp. 446–457.

Electrical Communication, vol. 64, No. 2/3, 1990, Romford, Essex, GB, "Universal ATM Video Coding Architecture", D'Agostini et al., pp. 186–193.

"Packet Switch Suitable . . . ", NIDE, Abstract of European Patent EPO338558A (Issue date: Oct. 1989).

*Primary Examiner*—Hassan Kizou
*Attorney, Agent, or Firm*—Staas & Halsey

[57] ABSTRACT

A television signal and ATM cell switching system for switching ATM cells of data other than television signals and for supplying one channel among a plurality of channels of television signals transmitted from a source to a subscriber to carry out one-way communication of the television signals from the source to the subscribers and two-way communication of the data other than the television signals between the network and the subscribers comprising, a television signal transmitting unit for transmitting television signals in the form of ATM cells, an ATM switching unit for switching ATM cell data other than the television signals, a television signal cell inserting circuit for receiving a plurality of channels of the television signals from the television signal transmitting unit, and for receiving ATM cell data other than the television signals after being switched by the ATM switching unit, the television signal inserting circuit comprising, a demultiplexing circuit for demultiplexing the output of the ATM switching unit to provide a plurality of outputs corresponding to respective subscribers, and a plurality of multiplexing circuits each for multiplexing the demultiplexed ATM cell received from one corresponding output of the demultiplexing circuit and one channel of the ATM cells selected in accordance with a request from the corresponding subscriber.

8 Claims, 7 Drawing Sheets

TELEVISION SIGNAL AND ATM CELL SWITCHING SYSTEM

This application is a continuation of application Ser. No. 07/882,955, filed May 14, 1992, now abandoned.

BACKGROUND OF THE INVENTION

(1) Field of the Invention

The present invention relates to a television signal and an asynchronous transfer mode (ATM) cell switching system for accommodating television signals sent from a cable television head end (CATV-HE) into an ATM switching network, to provide a subscriber with both a television signal and ATM cell data other than the television signal.

(2) Description of the Related Art

Switching and connecting television signals of a plurality of channels output from a CATV-HE to a plurality of subscribers connected to an ATM switching network has been required. There is no such technique in the prior art.

SUMMARY OF THE INVENTION

An object of the present invention is to provide a television signal and ATM cell switching system that can provide both a television signal and an ATM cell to a subscriber connected to an ATM switching network.

To attain the above object, the present invention provides a television signal and ATM cell switching system switching channels of television signals from a source and ATM cells of data other than the television signals from a network, and supplying one of the channels of television signals and data other than the television signals to individual subscriber. To accomplish the above object, the present invention comprises a television signal switching unit, an ATM switching unit, and a multiplexing unit. In the present invention, the television signal switching unit is operatively connected to the source and switches the channels of television signals to provide a plurality of television signal outputs directed to respective subscribers. Further, in the present invention, the ATM switching unit switches the ATM cells of data other than the television signals to provide ATM cells directed to the respective subscribers. In addition, in the present invention, the multiplexing unit is operatively connected to the output of the television signal switching unit and the ATM switching unit and multiplexes each output of the television signal switching unit and each output of the ATM switching unit to provide a multiplexed television and data signal to one of the directed subscribers. In the present invention, one-way communication of the television signals from the source to the subscribers and two-way communication of the data other than the television signals between the network and the subscribers are carried out.

In the above system, the television signal switching unit is a space-division type synchronous transfer mode switch for switching a plurality of channels of the television signals in accordance with requests from the subscribers.

Alternatively, in the above system, the source has an ATM cell generating unit for generating ATM cells of the television signals. In this case, the television signal switching unit, the the ATM switching unit, and the multiplexing unit consist of a single ATM switch.

Another aspect of the present invention provides a television signal and an ATM cell switching system in an exchange apparatus for performing data switching of ATM cells and for supplying one channel among television signals of a plurality of channels transmitted from a source to a subscriber. The above aspect of the present invention comprises a television signal transmitting unit, an ATM switching unit, and a television signal inserting circuit. The television signal transmitting unit transmits television signals in the form of ATM cells. The ATM switching unit switches ATM cell data other than the television signals. The television signal cell inserting circuit is operatively connected to the television signal transmitting unit and the ATM switching unit and receives a plurality of channels of television signals from the television signal transmitting unit, and receives ATM cell data other than the television signals after being switched by the ATM switching unit. The television signal inserting circuit comprises a demultiplexing circuit and a plurality of multiplexing circuits. The demultiplexing circuit is operatively connected to the ATM switching unit demultiplexes the output of the ATM switching unit to provide a plurality of outputs corresponding to respective subscribers. The plurality of multiplexing circuits are operatively connected to the outputs of the demultiplexing circuit respectively and connected to the television signal transmitting unit. Each of the multiplexing circuit multiplexes the demultiplexed ATM cell received from one corresponding output of the demultiplexing circuit and one channel of the ATM cells selected in accordance with a request from the corresponding subscriber. Therefore, one-way communication of the television signals from the source to the subscribers and two-way communication of data other than the television signals between the network and the subscribers are carried out.

The above system further comprises a designated channel selecting unit, operatively connected to the plurality of multiplexers, for providing a channel designating signal to each of the multiplexers in accordance with a request from the corresponding subscriber. Each of the multiplexers selects one channel of the television signals in accordance with the channel designating signal.

In the above system, an ATM cell in each channel of the television signals is provided with a VCI area. When one of the multiplexing circuits detects an ATM cell representing the television signal of the channel requested by a subscriber, the multiplexing circuit writes a VCI into the VCI area, indicating that the destination of the ATM cell is the subscriber.

In the above system also, each of the plurality of multiplexing circuits in the television signal inserting circuit is driven by a token circulating through the plurality of multiplexing circuits to output an ATM cell to the corresponding subscriber.

BRIEF DESCRIPTION OF THE DRAWINGS

The above object and features of the present invention will be more easily understood when read from the following description of the preferred embodiments with reference to the drawings, wherein.

DESCRIPTION OF THE PREFERRED EMBODIMENTS

Figure 1:
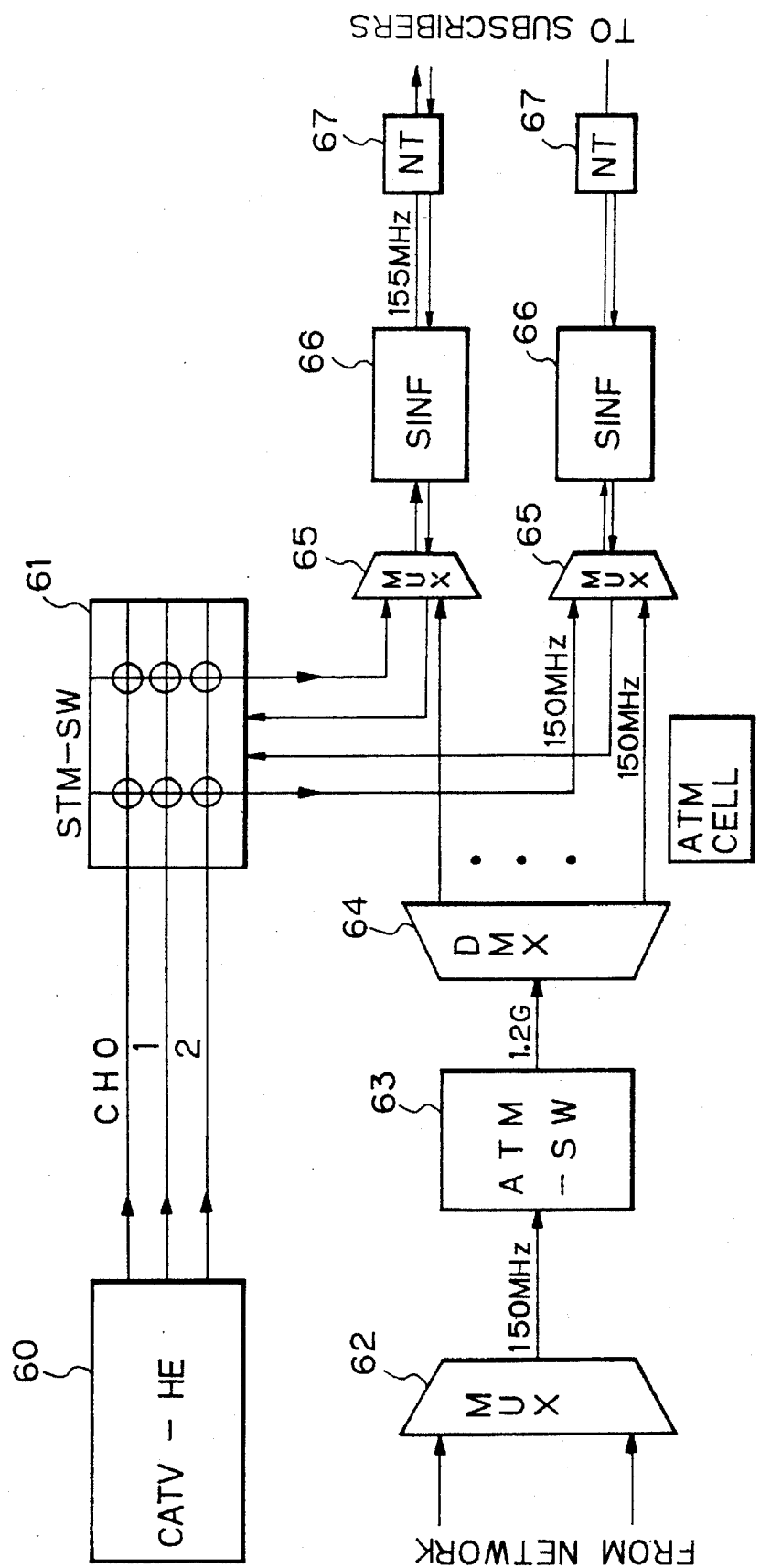
FIG. 1 is a diagram of a television signal and an ATM cell switching system according to a first embodiment of the present invention.

FIG. 1 is a construction diagram of a television signal and an ATM cell switching system according to a first embodiment of the present invention In FIG. 1, 60 is a cable television head end (CATV-HE) that is a source for transmitting a plurality of channels CH0, CH1, CH2, . . . of television signals, 61 is a normal space-division type synchronous transfer mode switch (STM-SW) for switching the television signals in accordance with requests from the subscribers to provide a plurality of television signal outputs directing to said subscribers respectively; 62 is a multiplexer (MUX) for multiplexing ATM cells of data from a network of, for example, a public network of 64 KHz, other than the television signals to output multiplexed ATM cells of 150 MHz, for example; 63 is an asynchronous transfer mode switch (ATM-SW) for switching the ATM cells to output, for example, 1.2 GHz of ATM cells, 64 is a demultiplexer (DMUX) for demultiplexing the 1.2 GHz ATM cells into ATM cells of 150 MHz corresponding to respective subscribers; 65 represents multiplexing circuits each for multiplexing the television signal and the ATM cell corresponding to one subscriber; 66 represents subscriber interface circuits (SINF), and 67 represents network terminators (NT) each for supplying one of the channels of television signals and data other than the television signals to each of the subscribers.

In the construction shown in FIG. 1, digital signals for usual data communication, personal computer communication, speech sound, and so forth, are input, in the form of ATM cells, to the multiplexer 62 and are multiplexed, then switched and connected by the ATM-SW 63, demultiplexed by the demultiplexer to correspond to respective subscribers, and are input to the multiplexer 65.

On the other hand, cable television signals (digital signals) are output from the CATV-HE 60 as respective channels (CH0, CH1, . . .), and are input to the STM-SW 61. In response to requests from respective subscribers, the space division switch STM-SW 61 performs a switching and connection by software. Thus, desired channel signals are output to the output lines corresponding to respective subscribers, and are input to the multiplexing circuits 65 provided to correspond to the respective subscriber circuits 66.

Thus one-way communication of the television signals from the source to the subscribers and two-way communication of the data other than the television signals between the network and the subscribers are carried out.

The system shown in FIG. 1, however, has the following disadvantage.

Figure 4:
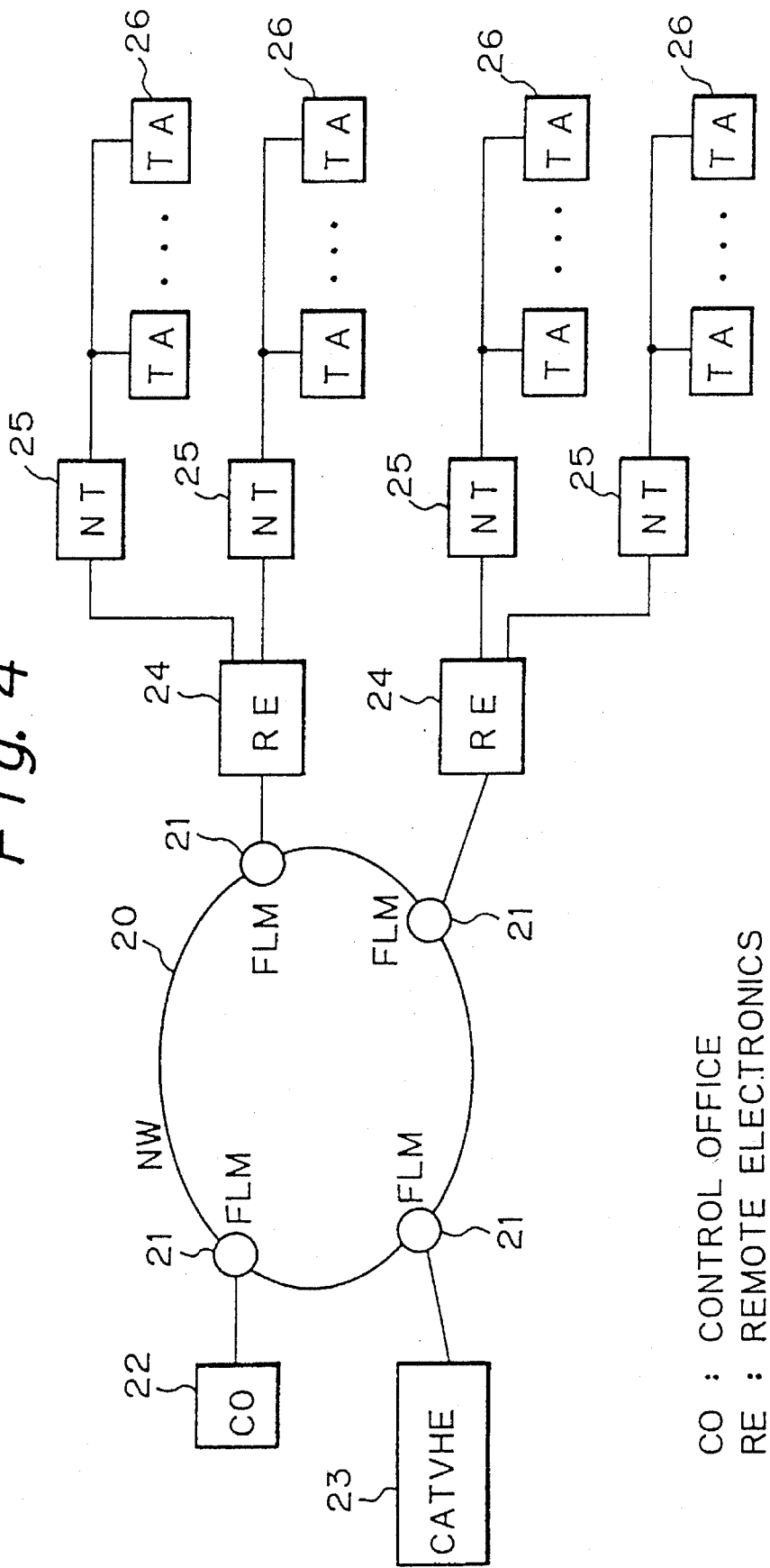
FIG. 4 is a diagram of a network system in which the present invention is implemented.

The respective subscriber circuits 66 are connected through subscriber lines to the network terminators 67. To each network terminator 67, a plurality of terminal adapters (not shown in FIG. 1 but are shown in FIG. 4) are connected in parallel formation. Corresponding to the terminal adapters, a TV unit, a personal computer, a data terminal, and so forth are respectively connected so that communication is possible among a plurality of units. Note that, between the subscriber circuit 66 and the network terminator 67, a transmission is performed in accordance with, for example, STS-n (Synchronous Transfer Signal Level n). When it is at level 3 (STS-3) where n=3, a transmission is performed by 155.52 Mbps (megabits per second).

When the STS-3 is employed, the ATM cells at each output of the demultiplexer 64 form an approximately 150 MHz band that can be divided by VCIs (Virtual Call Identifications) in the respective ATM cells. However, the television signals passed through the STM-SW 61 are not the ATM cells but have a broader band than each ATM cell. When one channel of the television signal is 150 MHz, and the communication line between the subscriber circuit 66 and a terminal of the subscriber allows only 155 MHz, the down line is occupied by only one channel of the television signal. Therefore, communication of signals other than the television signal cannot occur because the ATM cells are temporarily stored in a buffer (not shown). The television signal, however, is a continuous signal not buffered but selected to be output from the multiplexers 65 with a priority, even while the ATM cells have to wait to pass the multiplexer. Since the television signal is transmitted by one-way communication, the up-line becomes empty.

Even if communication from the multiplexing circuit 65 through the subscriber circuit 66 to the subscriber is made possible by, for example, 600 MHz (STS-12) instead of the above example of STS-3, and if ¾ band (450 MHz) is always reserved for the television signal, then only ¼ band (150 MHz) can be used for signals other than the television signals. Assume that one channel of the television signal uses 150 MHz. Then, in the above example, one subscriber always receives three channels of television signals simultaneously. Therefore, there is a problem in that, for communication other than the television signal transmission, only ¼ band (150 MHz) can be used. There may be a case in which 150 MHz is insufficient for communication other than the television signal transmission. Further, in this case, since the down direction line uses the broad ¾ band of one-way communication of the television signals, the up direction line cannot use such a broad band. Therefore, there is a using rate imbalance problem between the down line and the up line. Further, efficiency is reduced if units for the broad band are provided, because the units for the broad band cannot be used in communication through the up-line. Moreover, the band necessary for a video image of a television is generally 70 to 80 MHz and, even for a HD (High Density) TV, 110 to 120 MHz so that the whole band of 150 MHz for one channel cannot be used.

Figure 2:
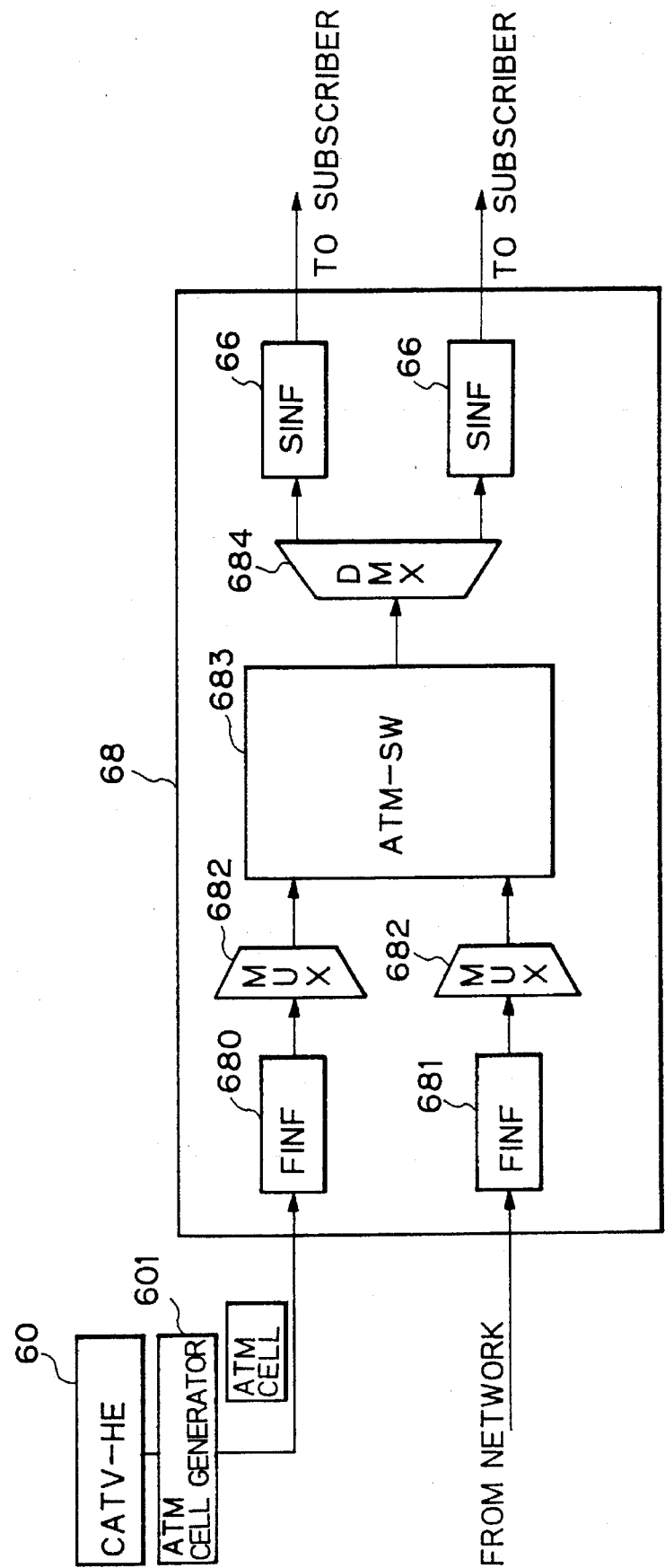
FIG. 2 is a diagram of a television signal and an ATM cell switching system according to a second embodiment of the present invention.

FIG. 2 is a block diagram of a television signal and ATM cell switching system according to a second embodiment of the present invention, which is considered to remove the above disadvantage in the system shown in FIG. 1. In the construction in FIG. 2, 68 is a concentrator (represented by RE: an abbreviation of a remote electronics) for concentrating a plurality of subscriber lines at a location far from a network such as a LAN, 680 and 681 are fiber interfaces (FINF) for interfacing to the CATV-HE 60 and a network connected through optical fibers respectively, 682 represents multiplexing circuits, 683 is an ATM-SW, 684 is a demultiplexing circuit, and the SINFs 66 are the same subscriber circuits as those shown in FIG. 1.

In this construction, a television signal output from the CATV-HE 60 is converted by an ATM cell generator 601 into the format of an ATM cell that is input to the FINF 680.

The signals other than the television signals are input to the FINF 681. Both the television signals and the usual data in the form of ATM cells are multiplexed by the multiplexing circuits 682 respectively and are switched by the ATM-SW 683. The demultiplexer 684 separates the ATM cells into signals corresponding to the respective subscribers and the separated signals are output to the subscriber circuits 66.

Thus, one way-communication of the television signal and two-way communication of data other than the television signals may be possible.

The system shown in FIG. 2, however, also has the following disadvantage.

Namely, in the ATM-SW 683, one ATM cell generally has only a single destination as a subscriber. Therefore, one channel of the television signal can be delivered to only a single subscriber so that a broad-casting function, in which the signal in the same channel is transmitted to a plurality of subscribers, cannot be realized. Even when a broadcasting is made possible in the system shown in FIG. 2 so that an ATM cell received from the CATV-HE 60 is always delivered to all subscribers, the using rate of the ATM-SW 683 is increased so that the communication band for other communication (data communication, television telephone and so forth) between subscribers becomes very narrow, resulting in decreased efficiency.

In more detail, in the system shown in FIG. 2, when an ATM cell provided with a VCI for each channel of the respective television channel is transmitted, the concentrator RE cannot perform a broadcasting function, because in the exchanging operation, one cell is transferred to only a single target location (destination). If an exchange operation is made so that a broadcasting cell is delivered to all subscribers, there is a problem in that memories provided at the respective cross points of the ATM-SW are always used, for example, n×80 MHz (n is the number of the broad casting channels), so that the band to be used for other purposes (data communication, television telephone, personal computer communication and so forth) becomes narrow.

Since the television signal requires an extremely broad transmission band, efficient exchange and connection cannot be performed by the system shown in FIG. 1 or FIG. 2. Therefore, an improvement thereof has been desired.

Figure 3:
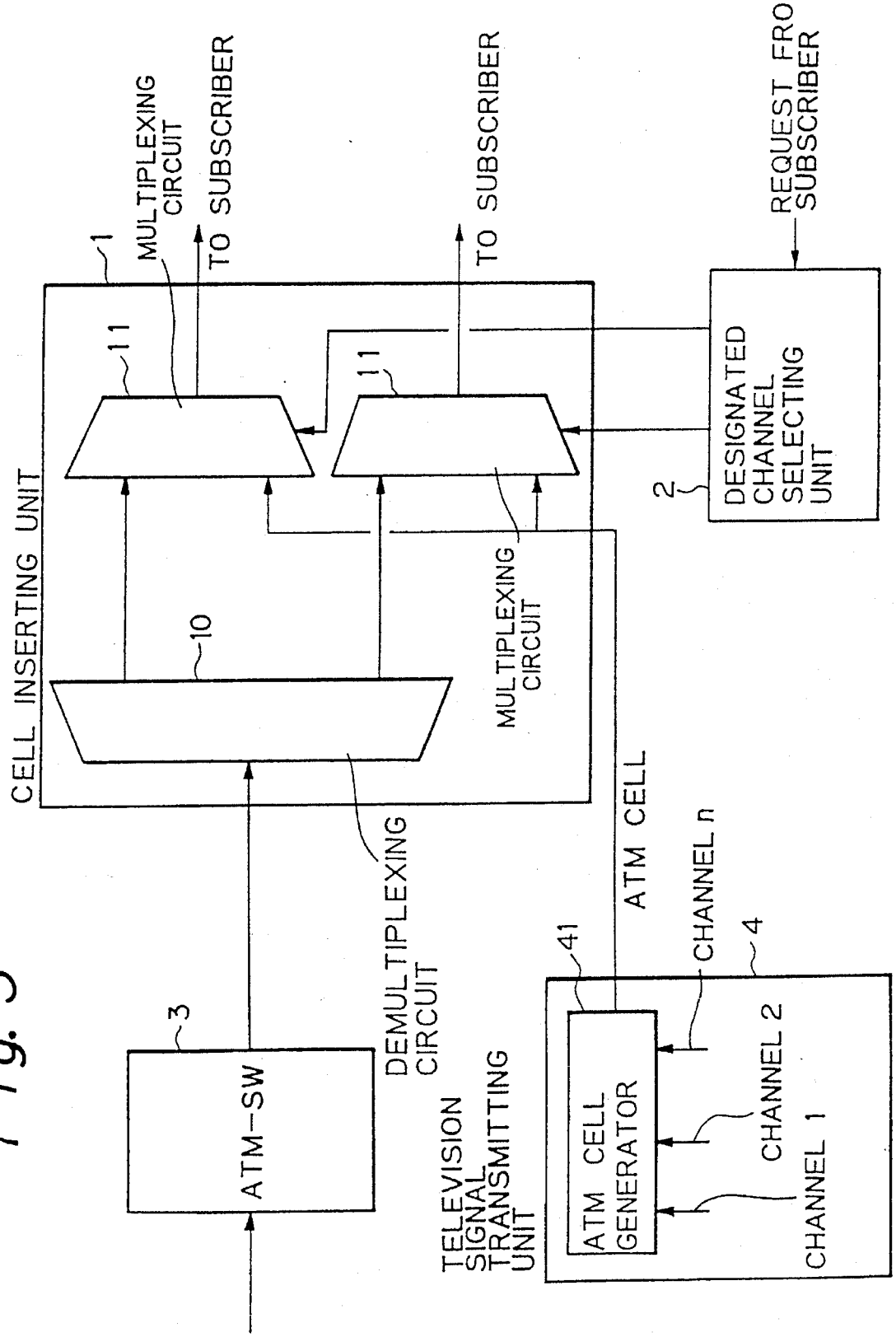
FIG. 3 is a diagram of a television signal and an ATM cell switching system according to a third embodiment of the present invention.

FIG. 3 is a diagram of a television signal and ATM cell switching system according to a third embodiment of the present invention.

In FIG. 3, 1 is a cell inserting unit for inserting a television signal cell of a designated channel into data signal cells output from an ATM switch other than the television signals; 10 is a demultiplexing circuit; 11 represents multiplexing circuits provided to correspond to respective subscribers; 2 is a designated channel selecting unit; 3 is the ATM switch (ATM-SW), and 4 is a television signal transmitting unit for transmitting multichannel television signals that are made to be ATM cells by an ATM cell generator 41.

As can be seen from FIG. 3, in the third embodiment of the present invention, the television signals that are made to be the ATM cells by the ATM cell generator 41 are inserted, without passing through the ATM switch 3, in a portion of a subscriber interface.

In an operation of the system shown in FIG. 3, ATM cells of data signals other than the television signals are output from the ATM switch 3 and are input to the cell inserting unit 1. In each ATM cell, as is well known, a VPI (Virtual Path Identification number) and a VCI (Virtual Channel Identification number) are included in the header, i.e., the heading five bytes of the ATM cell. The VCI indicates a particular subscriber as a destination of the ATM cell. The demultiplexing circuit 10 separates the ATM cells to be directed to destination subscribers in accordance with the VCIs. The separated ATM cells are input to the multiplexers 11 corresponding to the respective subscribers. Note that, in FIG. 3, for simplicity, only two multiplexers 11 are shown. However, the number of multiplexers is the same as the number of subscribers.

On the other hand, from the television signal transmitting unit 4, multi-channel television signals are output as multiplexed ATM cells and are input to the respective multiplexing circuits 11 in the cell inserting unit 1. The ATM cells from the demultiplexing circuit 10 and one channel of the television signals selected from the multi-channel television signals output from the television signal transmitting unit 4 are selected and are multiplexed to be transmitted to the subscriber sides.

The channel to be selected from the multi-channel television signals is designated by the designated channel selecting unit 2. When the designated channel selecting unit 2 receives, through a D channel that is used in an integrated services digital network (ISDN) as a channel for passing control signals between a subscriber and the switch, the number of the channel that is desired by a subscriber, the unit 2 outputs an instruction to route the said channel to one or more of the multiplexing circuits 11.

In response to the instruction, each of the multiplexing circuits 11 detects the ATM cell of the television signal of the requested channel among the television signals of a plurality of channels, converts the destination (VCI) in the cell into a VCI of the subscriber connected to the multiplexing circuit 11, and transmits the cell to the subscriber side.

Thus, the respective subscribers can receive, from the multiplexing circuits 11, ATM cells of data signals other than the television signals and ATM cells of the television signal of the requesting channel.

Figure 5:
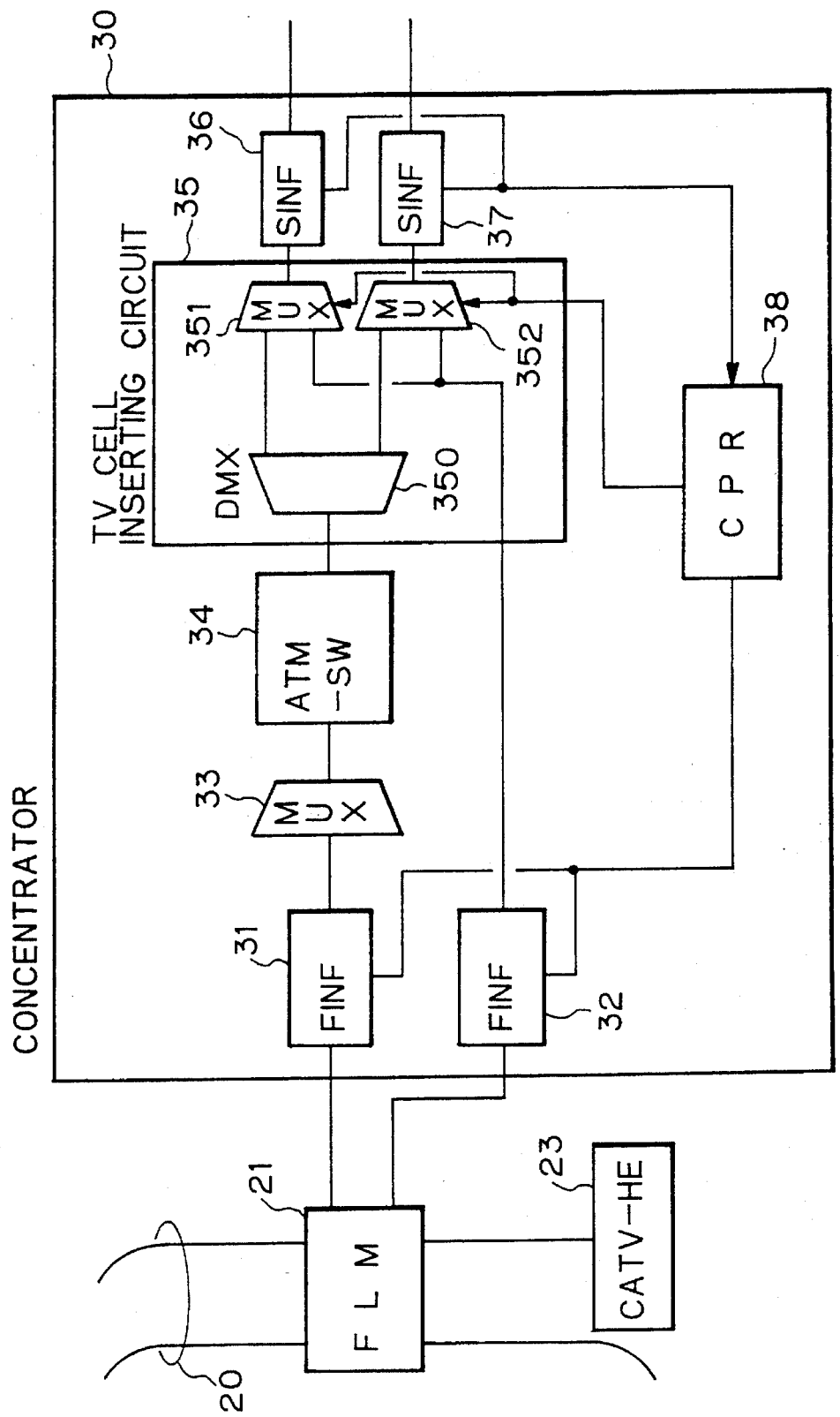
FIG. 5 is a diagram showing the construction of a concentrator according to the third embodiment of the present invention.
Figure 6:
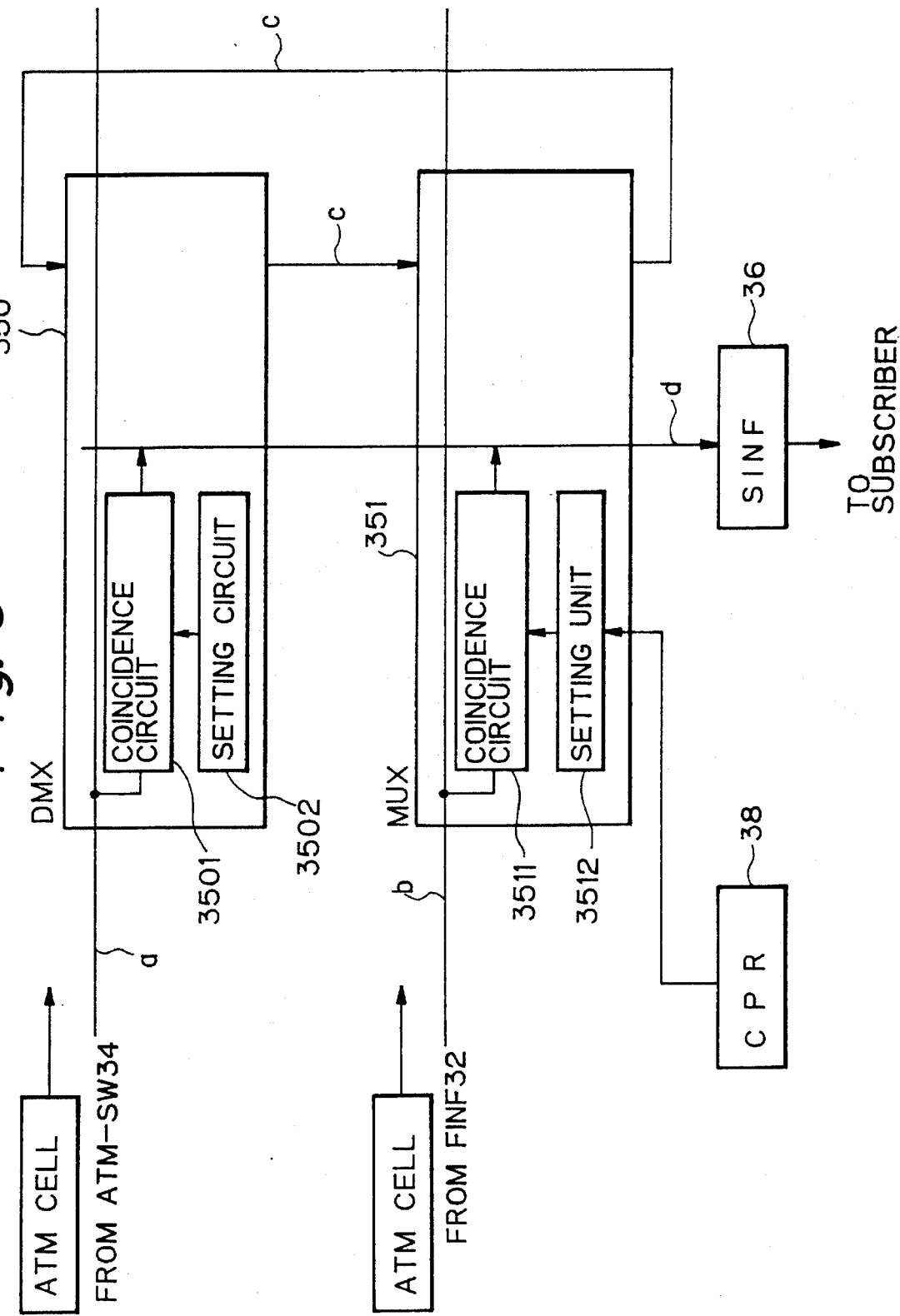
FIG. 6 is a diagram of a cell inserting circuit in the concentrator shown in FIG. 5.
Figure 7:
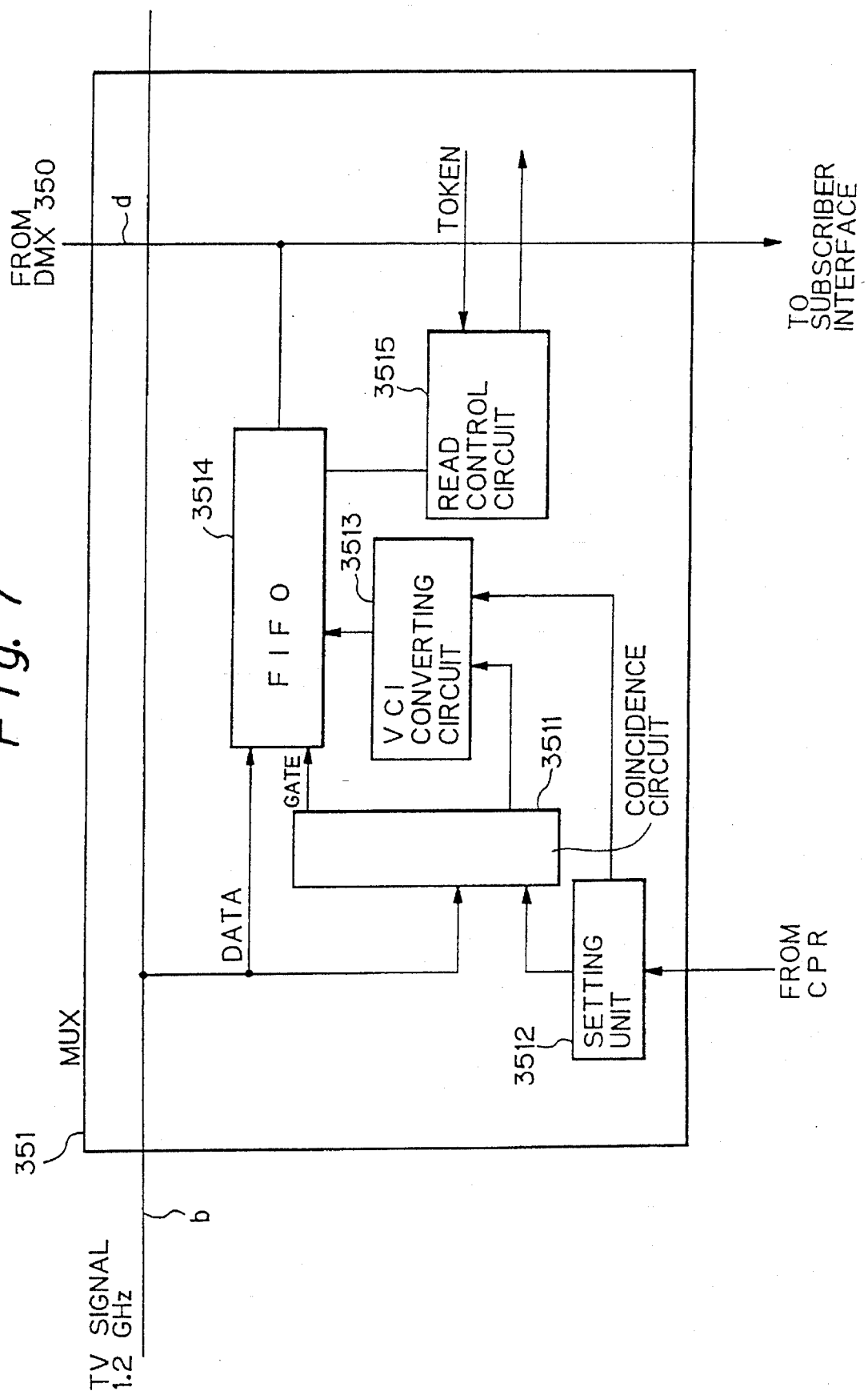
FIG. 7 is a diagram showing the construction of the multiplexing circuit shown in FIG. 5.

FIG. 4 is a system construction diagram of a network in which the present invention is implemented. FIG. 5 is a diagram of the construction of an embodiment of a concentrator. FIG. 6 is a diagram of the construction of a cell inserting unit. FIG. 7 is a diagram of the construction of a multiplexing circuit.

In FIG. 4, 20 is a network, such as a local area network (LAN), formed to be a loop by an optical cable for television broadcasting (for one-way communication in the down side) and two optical cables for various data other than the television signals (for two-way communication); 21 represents optical fiber loop multiplexers (represented by FLM) for connecting various units to the network 20; 22 is a control office (CO); 23 is a CATV-HE for television broad casting controlled by the control office 22; 24 represents concentrators (represented by RE) for concentrating plural subscriber lines and for performing switching and connection; 25 represents network terminators (NT) of the respective subscriber lines, 26 represent terminal adapters (represented by TA) for taking interfaces between a plurality of terminals to be connected to the respective subscriber lines and the NTs.

With respect to usual data signals between plural subscribers other than the television signals, paths are set from a concentrator 24 through a FLM 21, the network 20, another FLM 21, a concentrator 24, a network termination (NT) 25, and terminal adapters (TA) 26, to various terminals (personal computers, facsimile machines, telephone sets, etc., which are not shown in the figure), so that communication by using ATM cells is performed therebetween.

The television signals of plural channels from the CATV-HE 23 for television broadcasting are converted to ATM cells in the CATV-HE 23 or are converted to ATM cells at some stage along the way (for example, at the RE 24). Then, the ATM cells are transmitted through an optical cable for the television signals in the network (NW) 20 to FLMs 21 to which the concentrators 24 are connected. In the FLMs 21, the ATM cells are branched and are input to the concentrators (RE) 24 from which the ATM cells reach the network terminators (NT) 25 corresponding to the respective subscribers. From the network terminators (NT) 25, the ATM cells are supplied to one of the TV terminals (not shown) in the respective terminal adapters (TA) 26 for the subscribers.

FIG. 5 shows an example of the construction of the concentrator (RE) 24 shown in FIG. 4.

In FIG. 5, the reference numerals 20 to 23 are the network, the FLM, and the CATV-HE, respectively, as shown in FIG. 4, and 30 represents a concentrator (corresponding to 24 in FIG. 4). In the concentrator 30, 31 represents an optical fiber interface (represented by FINF) for handling ATM cells of usual data other than the television signals for broad casting; 32 is an optical fiber interface (also represented by FINF) for handling the ATM cells of television signals for broadcasting; 33 is a multiplexing circuit (MUX); 34 is an ATM switch (ATM-SW); 35 is a television signal cell (TV cell) inserting circuit; 36 and 37 are subscriber circuits (SINF) provided to correspond to respective subscribers; and 38 is a call processor (CPR).

In operation of the concentrator 24, when the television signals from the CATV-HE 23 are input through the FLM 21 to the FINF 32, the FINF 32 directly passes them to the TV cell inserting circuit 35 when the television signals have been made to be ATM cells. When the television signals from the FLM 21 are not made to be ATM cells, the FINF 32 makes them into ATM cells and then supplies them to the TV cell inserting circuit 35.

ATM cells of usual data signals other than the television signals pass through the FLM 21 and FINF 31 to the multiplexing circuit (MUX) 33, in which a plurality of inputs (only one is shown in the figure for simplicity) are multiplexed, and then switching is effected in the ATM-SW 34. The output thereof is input to the demultiplexing circuit (DMX) 350 in the TV cell inserting circuit 35.

The TV cell inserting circuit 35 consists of the demultiplexing circuit (DMX) 350 and multiplexing circuits (MUX) 351 and 352 for multiplexing the ATM cells from the demultiplexing circuit 350 and the ATM cells of a channel designated from the television signals.

When the CPR 38 receives channel information of a television signal required by a subscriber through a control channel (called a D channel) that is formed between the subscriber terminal and the CPR 38 through the subscriber circuit (SINF) 36 or 37 connected to each subscriber, the CPR 38 generates an instruction, which is given to the multiplexing circuit 351 or 352 in the TV cell inserting circuit 35. Note that the CPR 38 detects the state of the transfer operations in the FINFs 31 and 32 to grasp the transfer condition of the ATM cells.

FIG. 6 shows an example of the construction Of the TV cell inserting circuit. Note, however, that FIG. 6 shows the construction for only the SINF 36 in the TV cell inserting circuit 35 for one subscriber.

In FIG. 6, 350 is a part of the demultiplexing circuit (DMX) for one subscriber. The demultiplexing circuit 350 is represented by the same symbol 350 in FIG. 5. Reference numeral 351 represents the multiplexing circuit (MUX) 351 in FIG. 5, and SINF 36 and CPR 38 are the same units as those shown in FIG. 5. A line a conducts ATM cells of usual data transferred from the ATM-SW 34 in FIG. 5. A line b conducts ATM cells of television signals transferred from the FINF 32. A line c connects the DMX 350 and the MUX 351 to form a ring so as to conduct a token therethrough. And a line d is connected to the SINF 36 that is provided to correspond to a subscriber.

In operation of the device shown in FIG. 6, when an ATM cell of usual data from the line a is input to the DMX 350, a VCI included in the header of the ATM cell and the data in a setting unit 3502, in which a VCI is allocated to the subscriber, are compared by a coincidence circuit 3501. When they coincide, the coincidence circuit 3501 stores the ATM cell into a memory (not shown), from which the ATM cell is output to the line d. The output of the ATM cell to the line d is controlled by the token passing through the line c that forms a loop. The control by the token is later described with reference to FIG. 7. Thus, the ATM cell of usual data other than the television signals and having a destination to the destination subscriber is separated from the other ATM cells by the demultiplexer 350 and is output therefrom.

Note that, in the coincidence circuit 3501, instead of comparing the VCIs, when a well known method is employed in which tag data corresponding to the destination is added to the ATM cell, tag data indicating the destination of the subscriber may be set in the setting unit 3502, and a coincidence with the tag data of the input ATM cell may be detected.

To the multiplexing circuit 351, an ATM cell of a television signal is input through the line b. In the header of the ATM cell of the television signal, data indicating a channel is set as a VCI when the television signal is converted to the ATM cell in the CATV-HE 23 or the FINF 32. For example, CH1 (channel 1) is expressed by VCI=1, CH2 is expressed by VCI=2, ..., and CHn is expressed by VCI=n.

On the other hand, as described with reference to FIG. 5, when the CPR 38 receives channel information (required channel number) of the television signal that is requested by a subscriber through the control channel (D channel), the CPR 38 sets the VCI of the channel information in a setting unit 3512 in the MUX 351. For example, when it is CH1, "1" is set. A coincidence circuit 3511 in the MUX 351 compares the VCI in the header of the ATM cell of the television signal and the value in the setting unit 3512. When they coincide, the ATM cell of the television signal is stored in a memory (not shown) and when the MUX 351 receives the token through the line c, the ATM cell of the television signal is read from the memory to be output and is multiplexed with the ATM cell from the demultiplexer 350. The multiplexed ATM cells are output to the line d.

FIG. 7 shows an example of the construction of the multiplexing circuit (MUX) 351 in FIG. 6.

In FIG. 7, 3511 and 3512 are the coincidence circuit and the setting circuit respectively, which are the same as those shown in FIG. 6, and 3513 is a VCI converting circuit; 3514 is a FIFO (First In First Out) register, and 3515 is a read control circuit.

In an operation of the circuit shown in FIG. 7, in the setting unit 3512, the channel number requested by a subscriber designated by the CPR 38 in FIG. 5 and the VCI data of the subscriber (VCI allocated for communication with the destination subscriber) are set. When a television signal (about 1.2 GHz) is input through the line b to the MUX 351, the VCI in the header of the ATM cell and the channel number set in the setting unit 3512 are compared in the comparing circuit 3511. When they coincide, a signal (expressed by GATE) for opening a gate is supplied to the FIFO register 3514, whereby a data signal (expressed by DATA) of the ATM cell is input to the FIFO register 3514.

Also, by the coincidence output from the coincidence circuit 3511, the VCI converting circuit 3513 is driven. The VCI converting circuit 3513 converts or rewrites the VCI representing a channel number stored in the FIFO register 3514 into the VCI data of the destination subscriber set in the setting unit 3512.

The contents in the FIFO register 3514 are read from the read control circuit 3513 in a first-in first out fashion. The read operation is carried out when the token that is circulating through the line c shown in FIG. 6 reaches the MUX 351, and the read ATM cell is output to the line d to be multiplexed with the ATM cell from the DMX 350 shown in FIG. 6. The multiplexed signal is supplied to the SINF (subscriber interface) 36. Although the detailed construction of the DMX 350 (FIG. 6) is not shown, similar to FIG. 7, an ATM cell of usual data other than the television signal is temporarily stored in a FIFO, and when the token reaches the DMX 350, the ATM cell is read out to the line d.

From the foregoing description, it will be apparent that, according to the present invention, CATV television signals can be multiplexed with ATM cells in a public network such as an ISDN or ATM network. Further, a band can be efficiently used in comparison to the case in which a television signal is switched in accordance with STM (synchronous transfer mode). For example, when a STM (synchronous transfer mode) is used, and if a transmission line of 150 MHz is used, the whole band of 150 MHz is used even for a 80 MHz band data. In contrast, when the 80 MHz data is made to be ATM cells, only the 80 MHz band is used. Therefore, a 70 MHz band can be saved (150 MHz–80 MHz).

Also, by inserting the television signal without passing through an ATM switch and before the subscriber circuit (SINF), the band in the ATM switch can be efficiently used so that usual data communication other than the television signal obtains a margin in the frequency band. For example, if n channels of the television signals are not used in the ATM switch, about 80 MHz×n (channels) can be efficiently used.

What is claimed is:

1. A video signal and ATM cell switching system in an exchange apparatus for performing data switching of ATM data cells and for supplying one channel of a plurality of channels carrying video signals transmitted from a source to a subscriber, comprising:

video signal transmitting means for transmitting video signals in the form of ATM cells;

ATM switching means for switching the ATM data cells other than the video signals;

a video signal cell inserting circuit, operatively connected to said video signal transmitting means and said ATM switching means, for receiving a plurality of the video signals from said video signal transmitting means, and for receiving the ATM data cells other than the video signals after being switched by said ATM switching means, said video signal cell inserting circuit comprising:

a demultiplexing circuit, operatively connected to said ATM switching means, for demultiplexing the output of said ATM switching means to provide demultiplexed ATM data at a plurality of outputs corresponding to respective subscribers, and a plurality of multiplexing circuits, operatively connected to the outputs of said demultiplexing circuit respectively and connected to said video signal transmitting means, each for multiplexing each of the demultiplexed ATM data cells received from one corresponding output of said demultiplexing circuit and an ATM cell carrying a video signal of the one channel selected by a corresponding subscriber in accordance with a request from the corresponding subscriber; and designated channel selecting means, operatively connected to said plurality of multiplexing circuits, for providing a channel designating signal to each of said multiplexing circuits in accordance with a request from the corresponding subscriber, each of said plurality of multiplexing circuits selecting one of the video signals in accordance with said channel designating signal.

2. A video signal and ATM cell switching system in an exchange apparatus for performing data switching of ATM data cells and for supplying one channel of a plurality of channels carrying video signals transmitted from a source to a subscriber, comprising:

video signal transmitting means for transmitting video signals in the form of ATM cells;

ATM switching means for switching the ATM data cells other than the video signals;

a video signal cell inserting circuit, operatively connected to said video signal transmitting means and said ATM switching means, for receiving a plurality of the video signals from said video signal transmitting means, and for receiving the ATM data cells other than the video signals after being switched by said ATM switching means, said video signal cell inserting circuit comprising:

a demultiplexing circuit, operatively connected to said ATM switching means, for demultiplexing the output of said ATM switching means to provide demultiplexed ATM data cells at a plurality of outputs corresponding to respective subscribers, and a plurality of multiplexing circuits, operatively connected to the outputs of said demultiplexing circuit respectively and connected to said video signal transmitting means, each for multiplexing each of the demultiplexed ATM data cells received from one corresponding output of said demultiplexing circuit and an ATM cell carrying a video signal of the one channel selected by a corresponding subscriber in accordance with a request from the corresponding subscriber, wherein an ATM cell of the video signals is provided with a VCI area, and when one of said multiplexing circuits detects an ATM cell of the video signal of the channel requested by a subscriber, said one of said multiplexing circuits writes a VCI, indicating that the destination of said ATM data cell is said subscriber, into said VCI area.

3. A video signal and ATM cell switching system, in an exchange apparatus for performing data switching of ATM data cells and for supplying one channel of a plurality of channels carrying video signals transmitted from a source to a subscriber, comprising:

video signal transmitting means for transmitting video signals in the form of ATM cells;

ATM switching means for switching ATM data cells other than the video signals;

a video signal cell inserting circuit, operatively connected to said video signal transmitting means and said ATM switching means, for receiving a plurality of the video signals from said video signal transmitting means, and for receiving the ATM data cells other than the video signals after being switched by said ATM switching means, said video signal cell inserting circuit comprising:

a demultiplexing circuit, operatively connected to said ATM switching means, for demultiplexing the output of said ATM switching means to provide demultiplexed ATM data cells at a plurality of outputs corresponding to respective subscribers, and a plurality of multiplexing circuits, operatively connected to the outputs of said demultiplexing circuit respectively and connected to said video signal transmitting means, each for multiplexing each of the demultiplexed ATM data cells received from one corresponding output of said demultiplexing circuit and an ATM cell carrying a video signal of the one channel selected by a corresponding subscriber in accordance with a request from the corresponding subscriber, wherein each of said plurality of multiplexing circuits in said video signal inserting circuit is driven by a token circulating through said plurality of multiplexing circuits to output an ATM cell to the corresponding subscriber.

4. A network-node system, connected to a plurality of subscribers, supplying a channel of a video signal in the form of video-channel packets from a source to each of the plurality of subscribers and switching data packets other than said video signal to each of said plurality of subscribers, said network-node system comprising:

first means for receiving a plurality of channels of video signals, converting the received video signals into video-channel packets and multiplexing the video-channel packets into multiplexed video signals;

second means, operatively connected to one of said plurality of subscribers, identifying from the multiplexed video signals video-channel packets relating to the channel selected by the one of said plurality of subscribers, and for outputting an instruction to route the selected video channel packets to the one of said plurality of subscribers; and third means for receiving the instruction, for forming multiplexed signals by multiplexing said selected video-channel packets and said data packets directed to said one of the plurality of subscribers, respectively, and for supplying said multiplexed signals to the one of said plurality of subscribers.

5. A network-node system according to claim 4, wherein said multiplexed video signals are formed by a single unit.

6. A network-node system according to claim 4, further comprising an ATM switch coupled to the third means and outputting the data packets.

7. A network-node system according to claim 4, wherein said third means comprises multiplexing circuits, each multiplexing circuit being coupled to a respective one of said plurality of subscribers and supplying said multiplexed signals to the respective one of said plurality of subscribers, and a demultiplexing circuit, coupled to the plurality of multiplexing circuits and demultiplexing the data packets.

8. A network-node system according to claim 7, wherein said second means is coupled to the each multiplexing circuit.

* * * * *

UNITED STATES PATENT AND TRADEMARK OFFICE
CERTIFICATE OF CORRECTION

PATENT NO. : 5,513,180
DATED      : April 30, 1996
INVENTOR(S): MIYAKE et al.

It is certified that error appears in the above-indentified patent and that said Letters Patent is hereby corrected as shown below:

Column 2, line 16, after "unit", insert --and--;

Column 5, line 8, change "one way-communication to --one-way communication--;

line 18, delete [a];

Column 7, line 22, change "broad casting" to --broadcasting--;

line 40, change "(MUX)33 , in" to --(MUX)33, in--;

line 61. change "Of" to --of--.

Signed and Sealed this

Fifth Day of November, 1996

Attest:

BRUCE LEHMAN

*Attesting Officer*      *Commissioner of Patents and Trademarks*